(12) United States Patent
Cheng et al.

(10) Patent No.: US 12,031,923 B2
(45) Date of Patent: Jul. 9, 2024

(54) MICROWAVE MOISTURE CONTENT SENSOR AND METHOD FOR DERIVING LINEAR REGRESSION CORRELATION BETWEEN MOISTURE CONTENT OF OBJECT AND SIGNAL MEASURED BY MOISTURE CONTENT SENSOR

(71) Applicants: FineTek Co., Ltd., New Taipei (TW); National Taipei University of Technology, Taipei (TW)

(72) Inventors: Wei-Chen Cheng, Taipei (TW); Jwo-Shiun Sun, Taipei (TW); Guan-Yu Chen, Taipei (TW); Bing-Chen Lu, Taipei (TW); Chu-Hsien Cheng, Taipei (TW)

(73) Assignees: FineTek Co., Ltd., New Taipei (TW); National Taipei University of Technology, Taipei (TW)

( * ) Notice: Subject to any disclaimer, the term of this patent is extended or adjusted under 35 U.S.C. 154(b) by 400 days.

(21) Appl. No.: 17/546,016

(22) Filed: Dec. 8, 2021

(65) Prior Publication Data
US 2023/0119519 A1 Apr. 20, 2023

(30) Foreign Application Priority Data
Oct. 20, 2021 (TW) ................................ 110138882

(51) Int. Cl.
*G01N 22/04* (2006.01)
(52) U.S. Cl.
CPC .................................... *G01N 22/04* (2013.01)

(58) Field of Classification Search
CPC .... G01N 22/04; G01R 33/00; G01R 33/0035; G01R 33/0023; G01R 33/0017; G01R 31/3191
See application file for complete search history.

(56) References Cited

U.S. PATENT DOCUMENTS

2001/0002105 A1\* 5/2001 Brandelik .............. G01N 22/04
324/696

FOREIGN PATENT DOCUMENTS

CN 112748130 A \* 5/2021 ............. G01N 22/04
WO WO-9961878 A2 \* 12/1999 ............. C07H 11/00

\* cited by examiner

*Primary Examiner* — Jermele M Hollington
*Assistant Examiner* — Taqi R Nasir

(57) ABSTRACT

A microwave coupling moisture content sensor and a method for deriving a linear regression correlation between signal data generated by a microwave moisture content sensor and moisture contents of objects are disclosed. The microwave coupling moisture content sensor includes a microwave resonator and a signal feeding member or a microwave emitting member. An object is placed outside the microwave resonator, and the signal feeding member or the microwave emitting member emits microwaves, which penetrate the object. The resonance frequency and the amplitude of the microwave resonator are measured to obtain the moisture content of the object. Several objects having known moisture contents are detected by the microwave coupling moisture content sensor to obtain corresponding resonance frequency and amplitude. Correlation coefficients of several combinations are calculated, and the combinations having low correlation coefficients are removed, whereby the best linear regression correlation is derived for the measurement of moisture contents of objects.

10 Claims, 16 Drawing Sheets

US 12,031,923 B2

MICROWAVE MOISTURE CONTENT SENSOR AND METHOD FOR DERIVING LINEAR REGRESSION CORRELATION BETWEEN MOISTURE CONTENT OF OBJECT AND SIGNAL MEASURED BY MOISTURE CONTENT SENSOR

CROSS REFERENCE TO RELATED APPLICATIONS

The present application claims the benefit of Taiwanese Patent Application No. 110138882 filed on Oct. 20, 2021, the contents of which are incorporated herein by reference in their entirety.

BACKGROUND OF THE INVENTION

Field of the Invention

The invention relates to a technical field for measuring moisture contents of objects utilizing microwave, and more particularly to a microwave coupling moisture content sensor and a method for deriving a linear regression correlation between signal data measured by a microwave moisture content sensor and real moisture content values of objects through utilizing microwaves fed into a resonator to generate resonance electromagnetic field.

Description of the Related Art

The storage of various agricultural products, forestry products and even food often increases the moisture content due to the absorption of moisture in the air, which often leads to mold. In another case, when the weather is too dry, the moisture content of the article is greatly reduced and if the air temperature is also increased at the same time, the fire accident occurs easily. Therefore, it is very important to monitor the moisture content of items.

A typical method of measuring the moisture content of an article is to heat the article to remove the moisture in the article, and then calculate the weight difference before and after the heating to obtain the moisture content of the article. However, this method is quite time-consuming. As the typical method is based on sampling and testing, it is not easy to know the moisture content of the overall product when the amount of the samples is insufficient. Therefore, an online water content measuring instrument has been developed.

The existing online moisture content measuring devices are mainly divided into two types: contact type and non-contact type. The contact type means that the moisture content measuring device must contact the object to be measured to obtain the moisture content of the object, while the non-contact type uses a transmitter to emit electromagnetic waves, which pass through the object and are received by a receiver, whereby the property changes of the electromagnetic wave is measured to obtain the moisture content of the article. The non-contact online moisture content measuring device can be used in various applications due to its small size and small installation space requirements. Therefore, the development of non-contact online moisture content measuring instrument is an important trend at present.

BRIEF SUMMARY OF THE INVENTION

An object of the invention is to provide a volute-shaped microwave coupling moisture content sensor, a fork-shaped microwave coupling moisture content sensor and a method for deriving a linear regression correlation between signal data measured by a microwave moisture content sensor and moisture contents of objects, wherein a microwave resonator serves as a sensing head for detecting the moisture content of objects, and the variation of resonance frequency and amplitude of microwaves is detected when the objects are disposed in an distribution field of the microwaves, or the microwaves penetrate the objects to be detected. The moisture content of the objects is thus obtained.

The invention provides a volute-shaped microwave coupling moisture content sensor. The volute-shaped microwave coupling moisture content sensor in accordance with an exemplary embodiment of the invention includes a bottom wall, an inner shaft member spaced from the bottom wall by a distance and having a center, an outer annular member disposed on the bottom wall and surrounding the inner shaft, a connecting member connected to the inner shaft member at a first position and to the outer annular member at a second position, wherein the first position is spaced from the second position by an angular distance of 90 degree, a microwave feeding member disposed at the center of the inner shaft member; and an insulating plate disposed on an axial end surface of the outer annular member and covering the inner shaft member and the connecting member, wherein the bottom wall, the outer annular member, the inner shaft member, and the insulating plate constitute a microwave resonator.

In another exemplary embodiment, the connecting member includes a curved main body, a first connecting portion and a second connecting portion, the curved main body is disposed on the bottom wall and located between the inner shaft member and the outer annular member, the first connecting portion connects one end of the curved main body and the inner shaft member, the second connecting portion connects another end of the curved main body and the outer annular member.

In yet another exemplary embodiment, the curved main body is an arced body having a central angle of 90 degree with respect to the center of the inner shaft member.

In another exemplary embodiment, the outer annular member has a notch formed at a connection of the connecting member and the outer annular member, and the second connecting portion is disposed in the notch.

In yet another exemplary embodiment, the first connecting portion has a length twice as a length of the second connecting portion.

The invention also provides a fork-shaped microwave coupling moisture content sensor. The fork-shaped microwave coupling moisture content sensor includes a base, a pair of semi-cylindrical resonators disposed on the base, wherein each of the semi-cylindrical resonators includes a semi-cylindrical housing and an insulating plate covering the semi-cylindrical housing, and the semi-cylindrical housings of the semi-cylindrical resonators are opposite disposed and spaced by a predetermined distance, a microwave emitting member disposed in one of the semi-cylindrical resonators, a microwave receiving member disposed in the other one of the semi-cylindrical resonators, wherein the microwave receiving member and the microwave emitting member are opposite disposed, and a pair of electromagnetic coupling members disposed in the semi-cylindrical resonators respectively and perpendicularly disposed with respect to the microwave emitting member and the microwave receiving member respectively.

In another exemplary embodiment, the electromagnetic coupling members are disposed in the vicinity of the insulating plate, the electromagnetic coupling member is separated from the microwave emitting member by a gap, and the electromagnetic coupling member is separated from the microwave receiving member by another gap.

In yet another exemplary embodiment, the microwave emitting member and the microwave receiving member are distanced from two axial end surfaces of the respective semi-cylindrical housing by an equal length, and the semi-cylindrical housing has an axial length defined by a distance between the axial end surfaces and being half of a wave length of the electromagnetic wave corresponding a resonance frequency of the semi-cylindrical resonator.

In another exemplary embodiment, the microwave emitting member and the microwave receiving member are distanced from one axial end surface of the respective semi-cylindrical housing by a first length three times a second length distancing the microwave emitting member and the microwave receiving member from another axial end surface of the respective semi-cylindrical housing, and the semi-cylindrical housing has an axial length defined by a distance between the axial end surfaces and being equal to a wave length of the electromagnetic wave corresponding a resonance frequency of the semi-cylindrical resonator.

In yet another exemplary embodiment, the microwave emitting member and the microwave receiving member are distanced from one axial end surface of the respective semi-cylindrical housing by a first length three times a second length distancing the microwave emitting member and the microwave receiving member from another axial end surface of the respective semi-cylindrical housing, and the semi-cylindrical housing has an axial length defined by a distance between the axial end surfaces and being equal to a wave length of the electromagnetic wave corresponding a resonance frequency of the semi-cylindrical resonator.

The invention also provides a method for deriving a linear regression correlation between signal data generated by a microwave moisture content sensor and moisture contents of objects. The method includes the following steps: capturing a plurality of signal data of a plurality of objects having a known moisture content value with a microwave moisture content sensor; obtaining a combination number of n signal values among N signal values; calculating correlation coefficients of each combination; determining whether the correlation coefficients meet a requirement; if all the correlation coefficients fail to meet the requirement, obtaining a combination number of n−1 signal values among the N signal values; if all the correlation coefficients meet the requirement, obtaining the combination having the optimal correlation coefficients; deriving a linear regression correlation of the signal values corresponding to the optimal correlation coefficients; and completing the linear regression correlation.

The microwave coupling moisture content sensor of the present invention generates electromagnetic waves through a specific coupling structure. The electromagnetic waves distribute above the microwave coupling moisture content sensor and penetrate the objects to be measured, whereby the resonance frequency of the microwave resonator is measured. The moisture content causes reduction in the resonance frequency and the amplitude of the microwave resonator, whereby the moisture contents of the objects are measured. The microwave coupling moisture content sensor detects a plurality of objects having known moisture contents and generates a plurality of signal values corresponding to the moisture content values. The signal values are related to the resonance frequency and the amplitude. The combination of the signal values and the moisture content values having the optimal correlation coefficients is obtained through determination of the correlation coefficients of each combination of the signal values and the moisture content values meeting a required condition, and a regression correlation of measured signal value versus moisture content value of objects for the microwave coupling moisture content sensor is derived.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
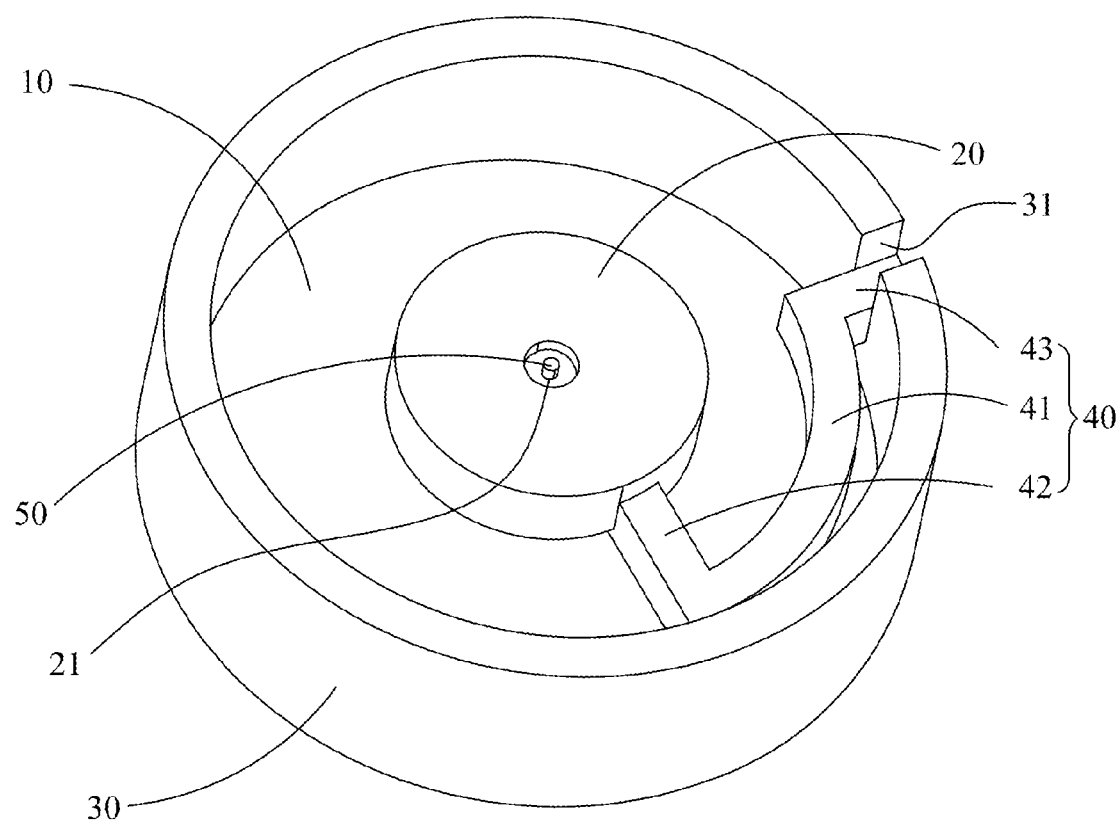
FIG. 1 is a perspective view of an embodiment of a volute-shaped microwave coupling moisture content sensor (without an insulating plate) of the present invention.
Figure 2:
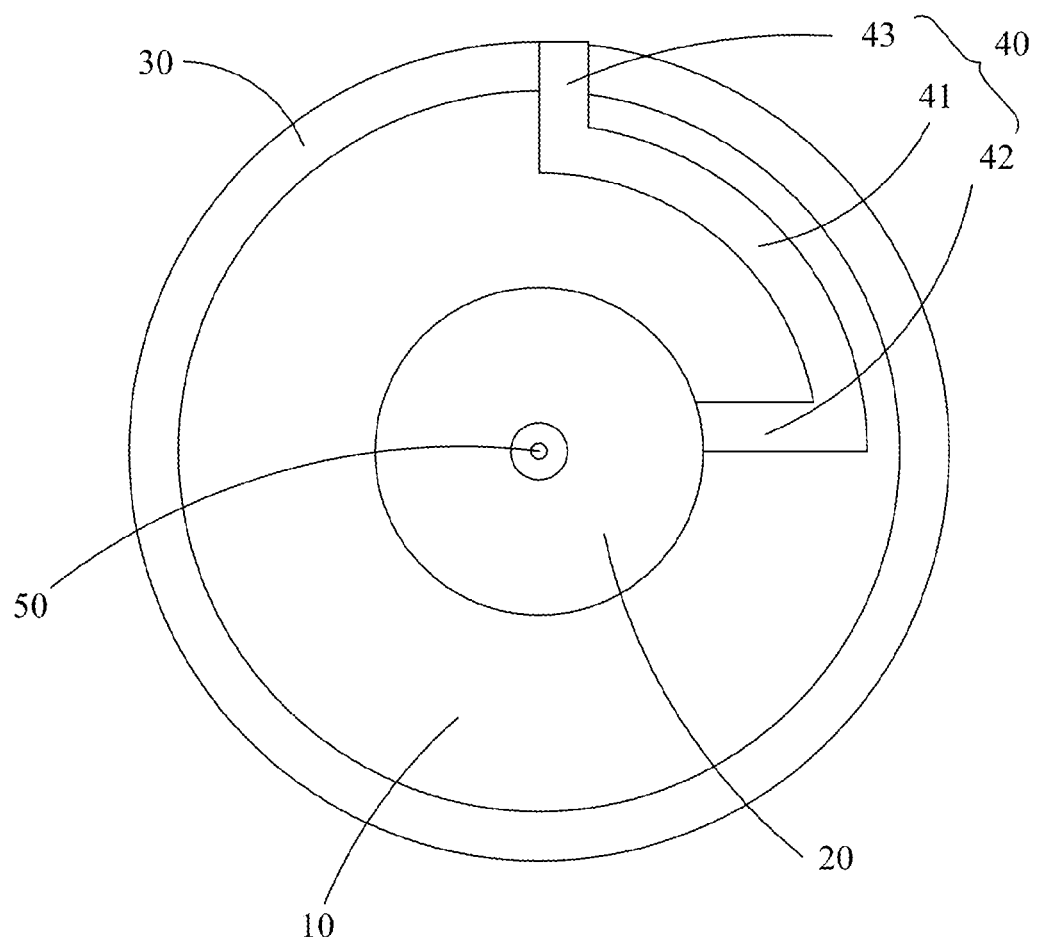
FIG. 2 is a top view of the volute-shaped microwave coupling moisture content sensor of FIG. 1.
Figure 3:
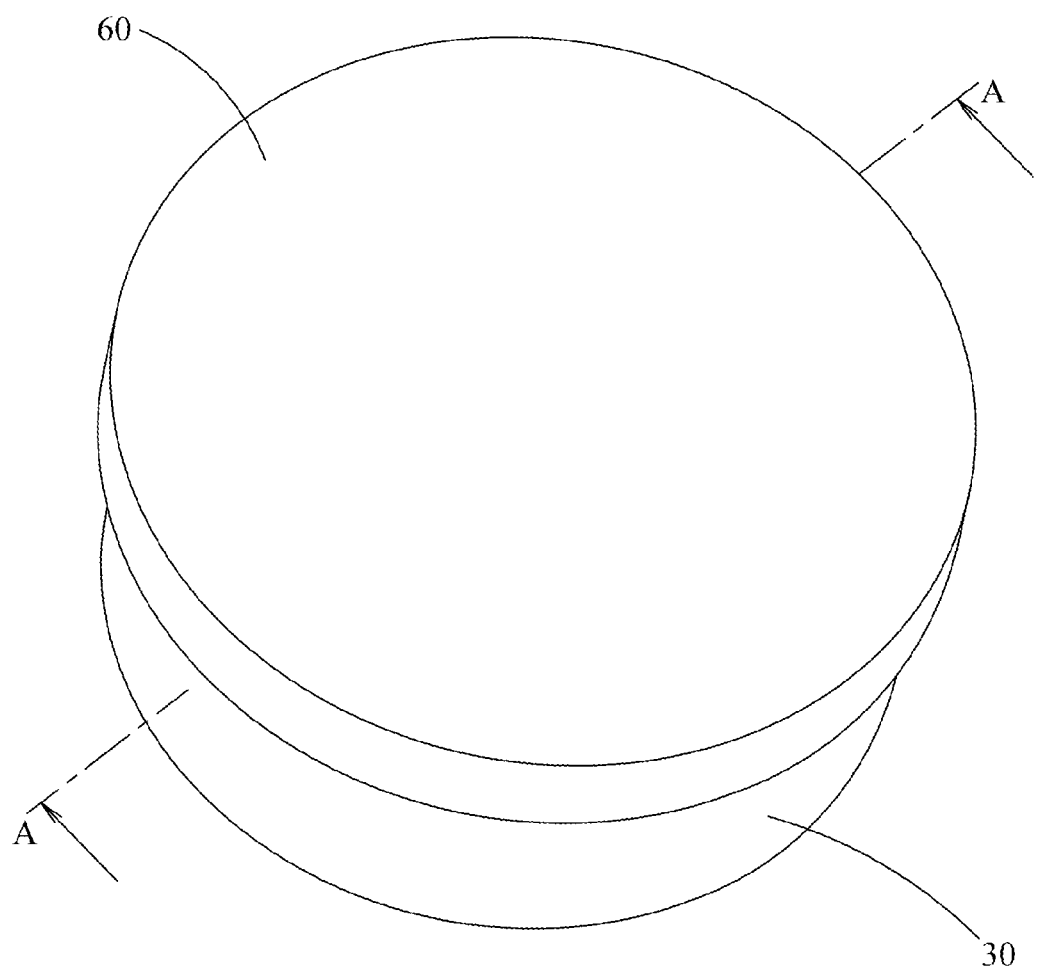
FIG. 3 is a perspective view of the volute-shaped microwave coupling moisture content sensor of FIG. 1 with the insulating plate.
Figure 4:
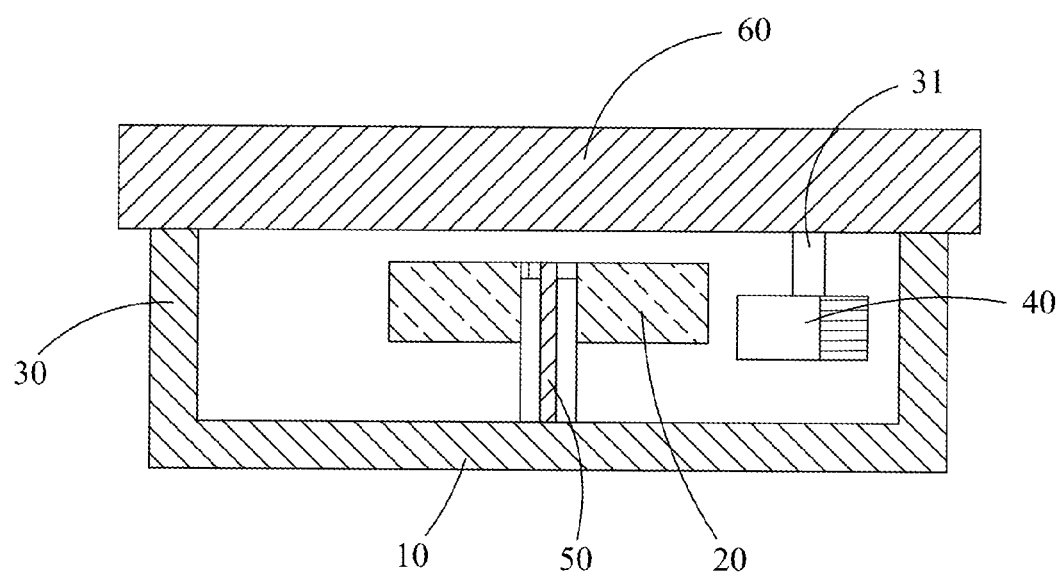
FIG. 4 is a cross section along line A-A of the volute-shaped microwave coupling moisture content sensor of FIG. 1.

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1, 2, 3 and 4, an embodiment of a volute-shaped microwave coupling moisture content sensor of the present invention is disclosed. The volute-shaped microwave coupling moisture content sensor includes a bottom wall 10, an inner shaft member 20, an outer annular member 30, a connecting member 40, a microwave feeding member 50 and an insulating plate 60.

The bottom wall 10 is a circular disc. The inner shaft member 20 is a cylindrical shaft, and a gap exists between the bottom wall 10 and the inner shaft member 20. The inner shaft member 20 has a center 21 where a through hole is formed. The microwave feeding member 50 is inserted into the through hole. The outer annular member 30 is disposed on the bottom wall 10 and connected to an outer rim of the bottom wall 10 to constitute a cylindrical structure. The outer annular member 30 coaxially surrounds the inner shaft member 20.

The connecting member 40 is connected to the inner shaft member 20 at a first position and connected to the outer annular member 30 at a second position. The first position and the second position are spaced by an angular distance of 90 degree. The connecting member 40 includes a curved main body 41, a first connecting portion 42 and a second connecting portion 43. The curved main body 41 is disposed on the bottom wall 10 and located between the inner shaft member 20 and the outer annular member 30. The curved main body 41 is an arced body having a central angle of 90 degree with respect to the center of the inner shaft member 20. The first connecting portion 42 is connected to the inner shaft member 20 and one end of the curved main body 41. The second connecting portion 43 is connected to the outer annular member 30 and the other end of the curved main body 41. The connecting member 40 is also spaced from the bottom wall 10 by a gap. The first connecting portion 42 has a length twice the length of the second connecting portion 43. That is the curved main body 41 is located closer to the outer annular member 30. The outer annular member 30 has a notch 31 disposed at the connection of the connecting member 40 and the outer annular member 30. The second connecting portion 43 is disposed in the notch 31 and connected to the outer annular member 30.

The bottom wall 10, the inner shaft member 20, the outer annular member 30, the connecting member 40 and the insulating plate 60 constitute a microwave resonator. The bottom wall 10, the inner shaft member 20, the outer annular member 30 and the connecting member 40 are manufactured by additive manufacturing technologies (three-dimensional printing), and the material for the additive manufacturing technologies is polylactic acid plastic (PLA), and two coating layers are formed on the surfaces of the bottom wall 10, the inner shaft member 20, the outer annular member 30 and the connecting member 40, wherein one of the coating layers is nickel layer which is formed on the surfaces, and the other coating layer is chromium layer which is formed on the nickel layer.

The microwave feeding member 50 is disposed at the center of the inner shaft member 20. In the present embodiment, the microwave feeding member 50 is the SMA probe. A network analyzer is connected to the microwave feeding member 50 to act as a signal feeding source.

The insulating plate 60 is disposed at an axial end surface of the outer annular member 30 and opposite to the bottom wall 10. The insulating plate 60 covers the inner shaft member 20 and the connecting member 40. The insulating plate 60 is made of ceramic. The insulating plate 60 is configured to support an object to be measured and prevents the object from entering the microwave resonator. On the other hand, as ceramic has high dielectric constant, the ceramic can increase the charge amount of the microwave resonator. Therefore, even though the moisture contents of various objects have slight difference, they can still be resolved by the microwave resonator of the present invention, whereby the resolution ability for the moisture contents of various objects is thus enhanced. The insulating plate 60 of the present embodiment has a dielectric constant ranging from 9 to 10 ($C^2/Nm^2$).

Figure 5:
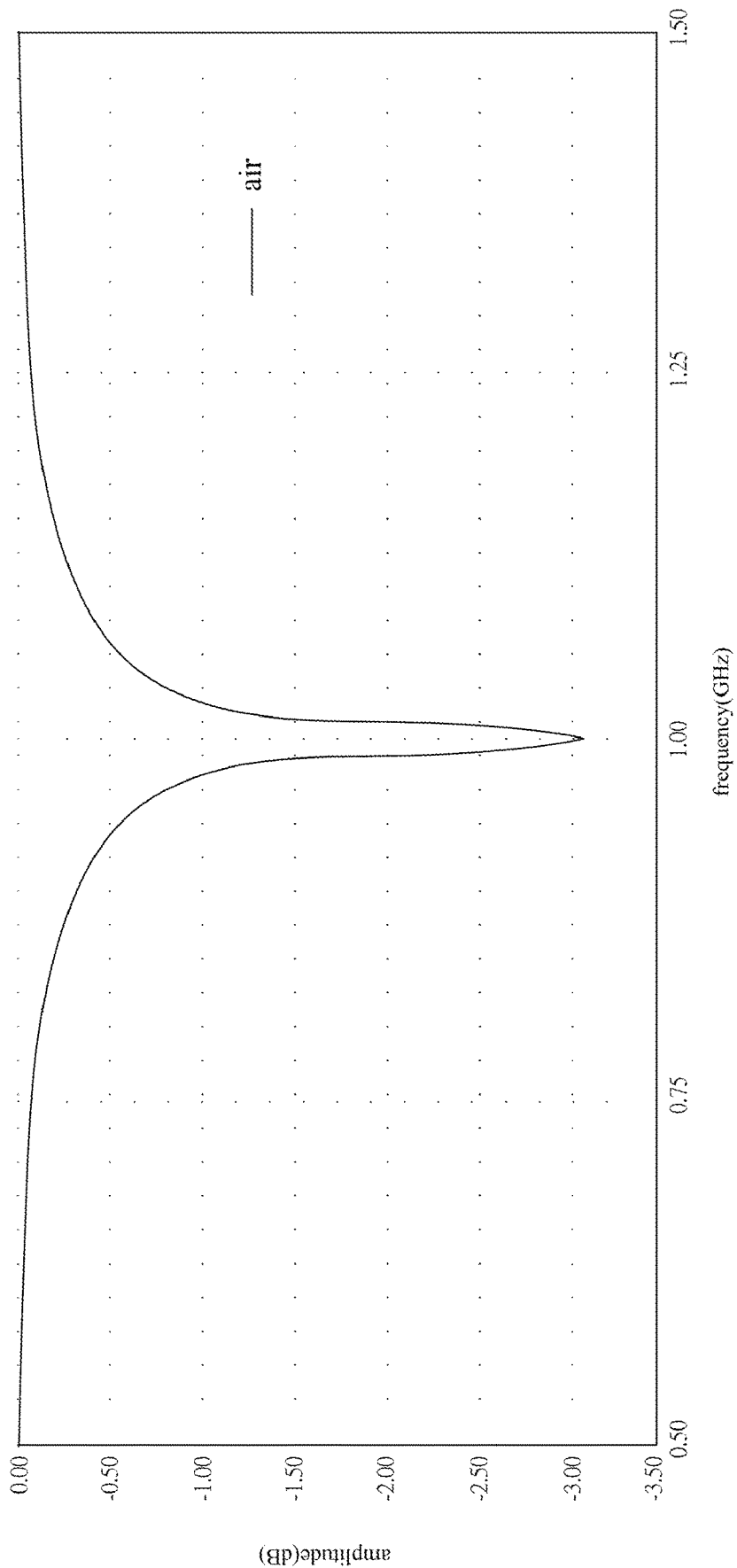
FIG. 5 is a frequency spectrum of resonance mode of the volute-shaped microwave coupling moisture content sensor of FIG. 1 without objects to be measured (merely air)
Figure 6:
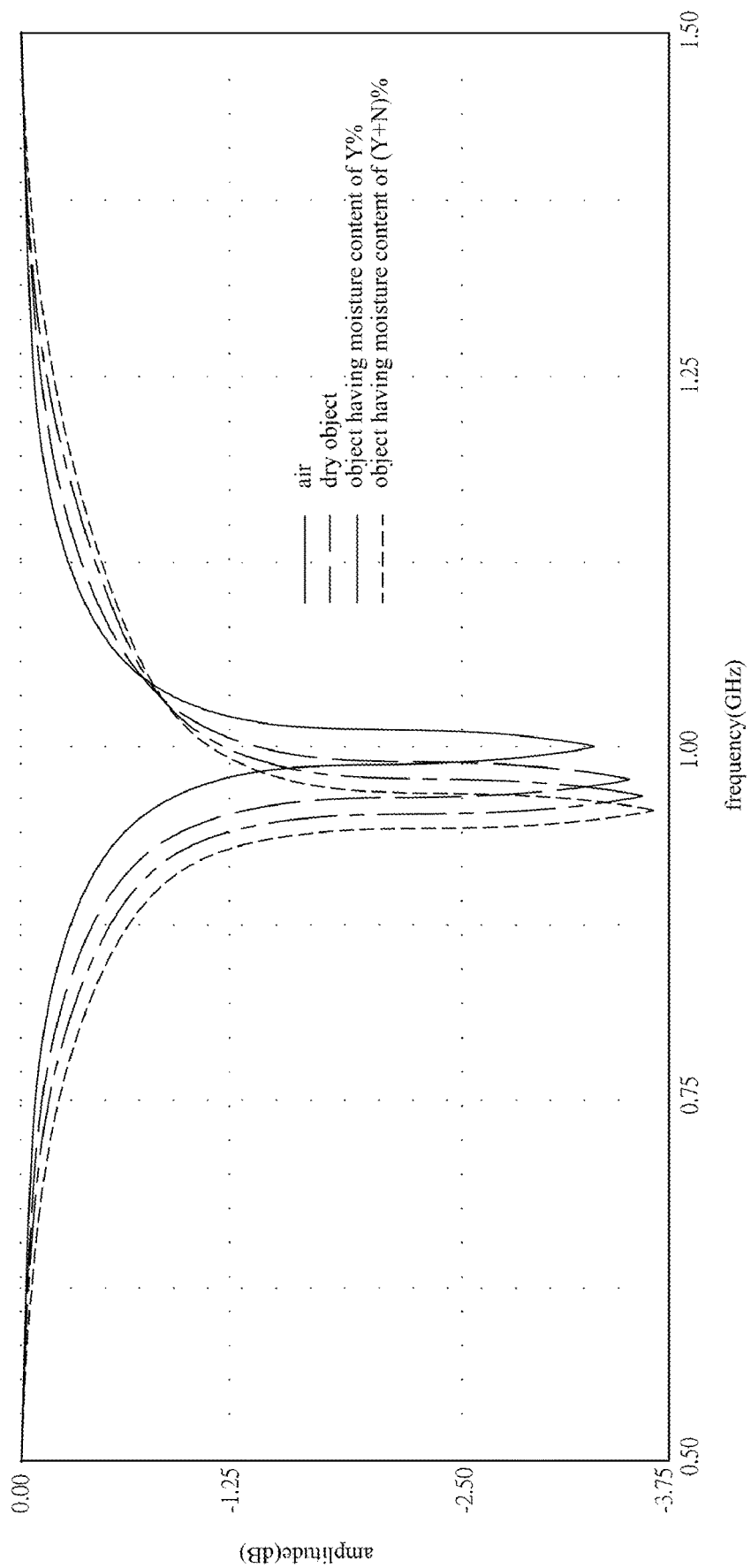
FIG. 6 is a frequency spectrum of resonance mode of the volute-shaped microwave coupling moisture content sensor of FIG. 1 having objects of different moisture contents.
Figure 7:
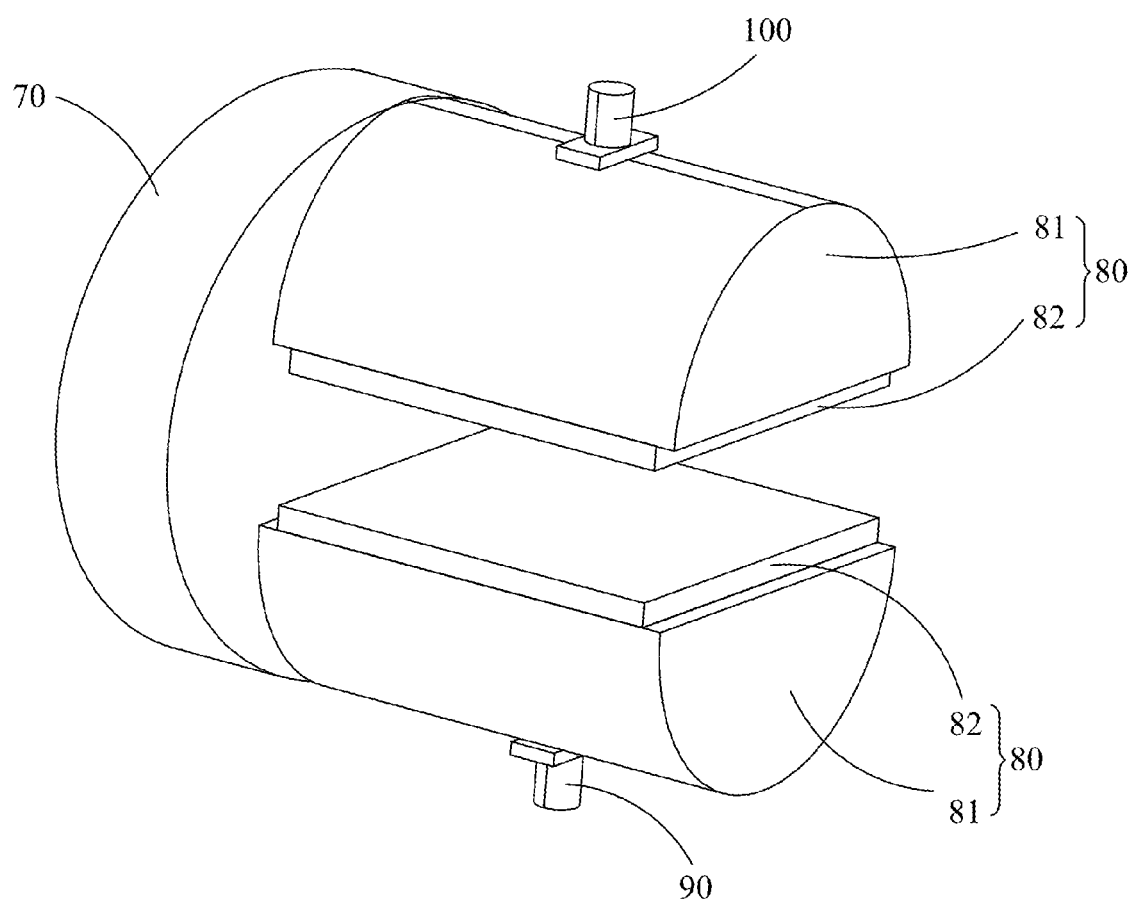
FIG. 7 is a perspective view of an embodiment of a fork-shaped microwave coupling moisture content sensor of the present invention.
Figure 8:
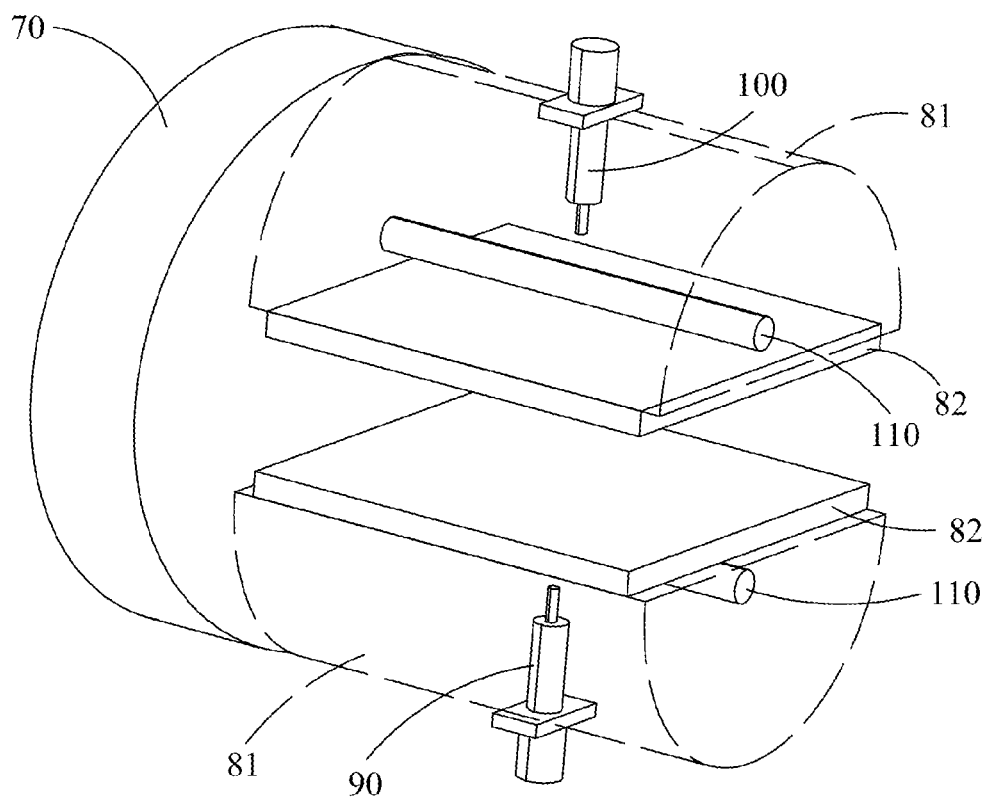
FIG. 8 is a perspective view of the fork-shaped microwave coupling moisture content sensor of FIG. 7 without a semi-cylindrical housing.

Referring to FIG. 5, the resonance frequency of the microwave resonator is detected as 1 GHz when no object (merely air) is placed on the insulating plate 60 of the volute-shaped microwave coupling moisture content sensor. Referring to FIG. 6, the resonance frequencies of the microwave resonator are detected when several objects having different moisture contents are placed on the insulating plate 60 of the volute-shaped microwave coupling moisture content sensor. The higher the moisture content is, and the resonance frequency of the microwave resonator is the lower. When only air is on the insulating plate 60, the resonance frequency of the microwave resonator is 1 GHz. As the moisture content of the object to be measured is increased, the resonance frequency of the microwave resonator is however reduced. Because the physical objects have a dielectric constant ranging from 2 to 10 ($C^2/Nm^2$), which is lower than the dielectric constant of water ranging from 79 to 81 ($C^2/Nm^2$). When the object has a higher moisture content, water contained in the object causes the increase of the overall dielectric constant, whereby the resonance frequency of the microwave resonator is detected to be lower, and the amplitude of the resonance is also lowered. Therefore, as the dielectric constant of object is related to the resonance frequency and related to the amplitude, the moisture content is measured out through the detection of the resonance frequency variation and amplitude variation of the microwave resonator when the objects having different moisture contents are placed on the volute-shaped microwave coupling moisture content sensor. As shown in FIG. 6, the curve in the middle represents the resonance frequency of the microwave resonator when only air is above the microwave resonator. The other curves arranged along the direction to lower frequency represent the resonance frequency of the microwave resonator corresponding to a dry object, an object having a moisture content of Y %, and an object having a moisture content of (Y+N) % respectively.

Referring to FIGS. 7, 8, 9 and 10, an embodiment of a fork-shaped microwave coupling moisture content sensor is disclosed. The fork-shaped microwave coupling moisture content sensor includes a base 70, a pair of semi-cylindrical resonators 80, a microwave emitting member 90, a microwave receiving member 100, and a pair of electromagnetic coupling members 110.

The base 70 is cylindrical, and the semi-cylindrical resonators 80 are disposed on one of the axial end surfaces of the base 70. Each of the semi-cylindrical resonators 80 includes a semi-cylindrical housing 81 and an insulating plate 82 cover the semi-cylindrical housing 81. Each semi-cylindrical housing 81 has a radius smaller than the radius of the base 70. A middle portion of a curved edge of the semi-cylindrical housing 81 is aligned with the outer rim of the base 70. The insulating plates 82 of the semi-cylindrical resonators 80 are opposite disposed and spaced by a predetermined distance. The insulating plate 82 of the present embodiment is made of polytetrafluoroethene (PTFE, Teflon). The insulating plate 82 prevents the objects to be measured from entering the semi-cylindrical resonators 80 to affect the resonance mode thereof.

The microwave emitting member 90 is disposed in one of the semi-cylindrical resonators 80, and the microwave receiving member 100 is disposed in the other semi-cylindrical resonator 80. The microwave emitting member 90 and the microwave receiving member 100 are opposite disposed. The microwave emitting member 90 and the microwave receiving member 100 are probes made of metal. In this embodiment, the microwave emitting member 90 and the microwave receiving member 100 are SMA probe. The commercial network analyzer is connected to the microwave emitting member 90 and the microwave receiving member 100 to act as a signal feeding port and a signal receiving port, and detects the frequency spectrum of the semi-cylindrical resonators 80. One end of the microwave emitting member 90 is secured to the semi-cylindrical housing 81 of one semi-cylindrical resonator 80, and one end of the microwave receiving member 100 is secured to the semi-cylindrical housing 81 of the other semi-cylindrical resonator 80. The end of the microwave emitting member 90 and the microwave receiving member 100 connected to the semi-cylindrical housing 81 is connected to a lead wire as a structure for feeding and receiving signals. The other end of the microwave emitting member 90 and the microwave receiving member 100 is disposed within the semi-cylindrical resonator 80 and spaced from the insulating plate 82 by a gap. The microwave emitting member 90 and the microwave receiving member 100 are aligned with each other.

A pair of electromagnetic coupling members 110 are disposed in the semi-cylindrical resonator 80 respectively, and perpendicular to the microwave emitting member 90 and the microwave receiving member 100. The electromagnetic coupling members 110 of the present embodiment are rods made of metal, which extend along the axial direction of the semi-cylindrical resonator 80 and correspond to the median line of the insulating plate 82. The electromagnetic coupling members 110 is separated from the insulating plate 82 by a gap. The microwave emitting member 90 and the microwave receiving member 100 is perpendicular to the electromagnetic coupling members 110 respectively. The gap between the microwave emitting member 90 and the insulating plate 82 is wider than the gap between the electromagnetic coupling member 110 and the insulating plate 82. Similarly, the gap between the microwave receiving member 100 and the insulating plate 82 is wider than the gap between the electromagnetic coupling member 110 and the insulating plate 82.

Signals are fed into the microwave emitting member 90 to emit microwaves. The microwaves penetrate the insulating plate 82 of one semi-cylindrical resonator 80, and afterward penetrate the object to be measured between two insulating plates 82. The microwaves which have penetrated the object propagate and penetrate the insulating plate 82 of the other semi-cylindrical resonator 80, and is received by the microwave receiving member 100. The resonance frequency and the amplitude of the semi-cylindrical resonators 80 is detected, whereby the moisture content of the object is obtained.

Figure 9:
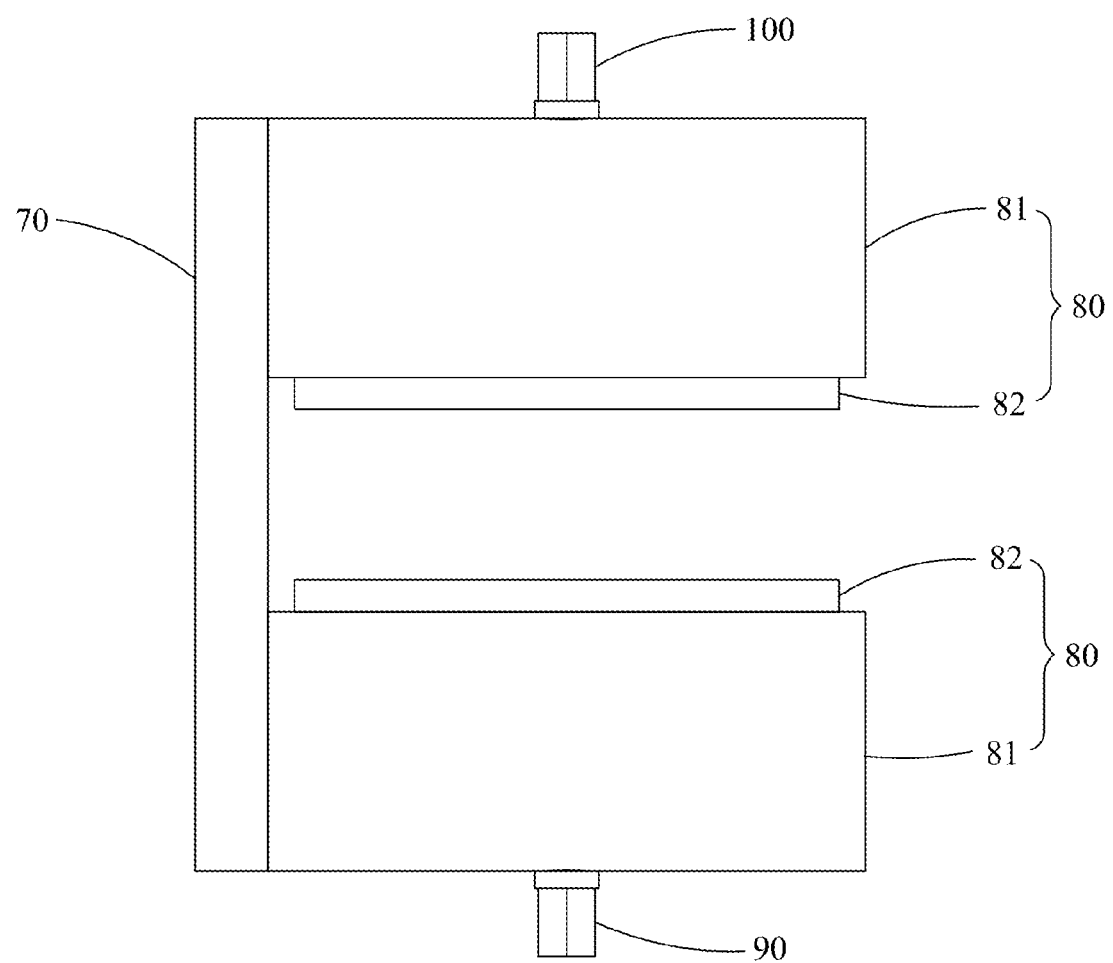
FIG. 9 is a side view of the fork-shaped microwave coupling moisture content sensor of FIG. 7.
Figure 10:
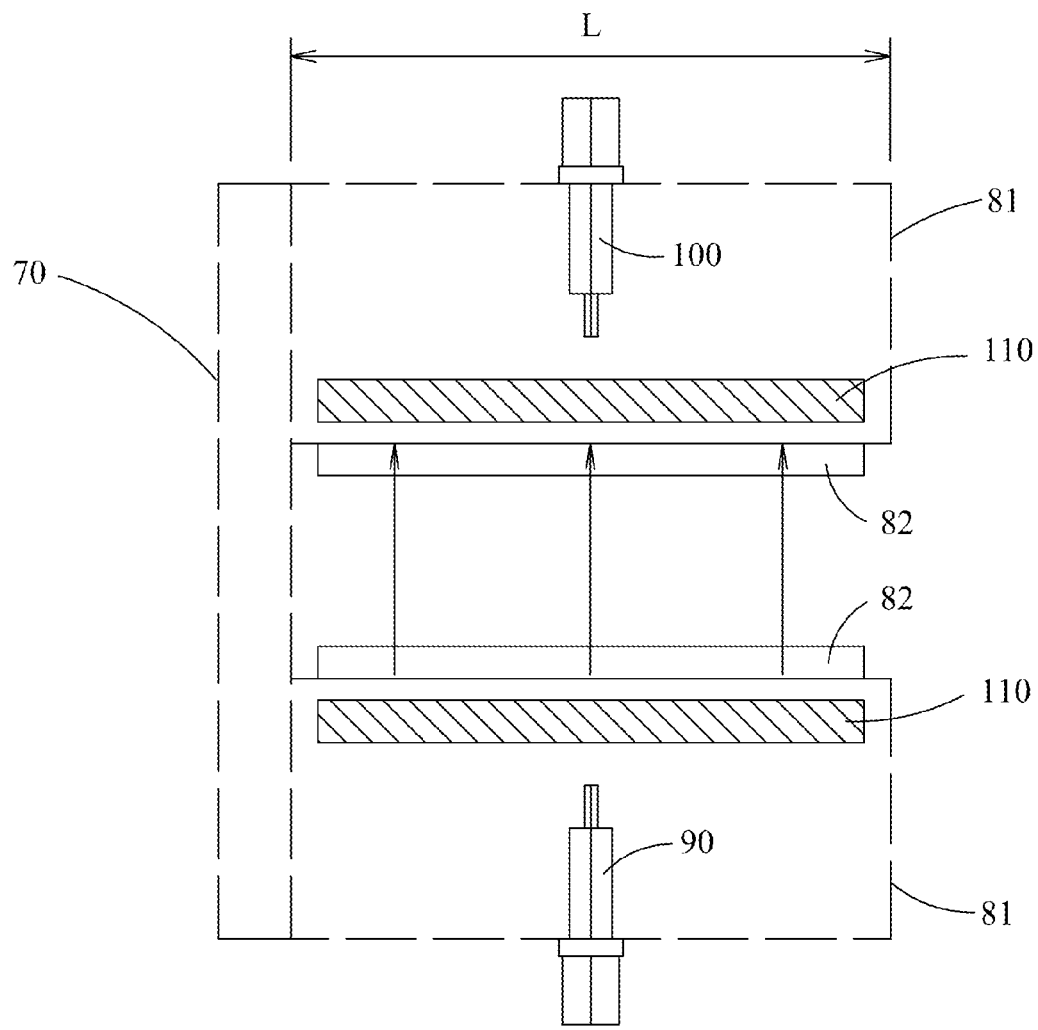
FIG. 10 is a side view of the fork-shaped microwave coupling moisture content sensor of FIG. 7 without a semi-cylindrical housing.

As for the fork-shaped microwave coupling moisture content sensor illustrated in FIGS. 9 and 10, the microwave emitting member 90 and the microwave receiving member 100 are spaced from two axial end surfaces of the respective semi-cylindrical housing by an equal distance. The semi-cylindrical housing 81 has an axial length L defined by the distance between two end surfaces thereof. The axial length L is half the wavelength λ of electromagnetic wave having the resonance frequency, i.e., L=½λ.

Figure 11:
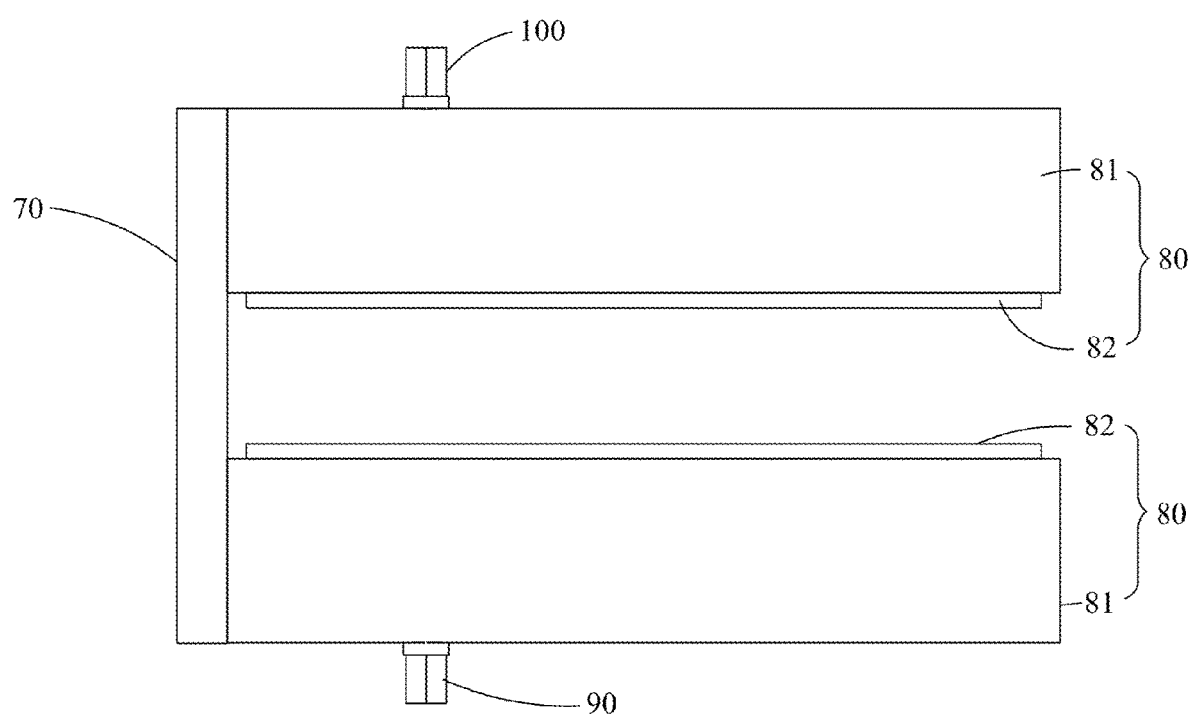
FIG. 11 is a side view of another embodiment of a fork-shaped microwave coupling moisture content sensor of the present invention.
Figure 12:
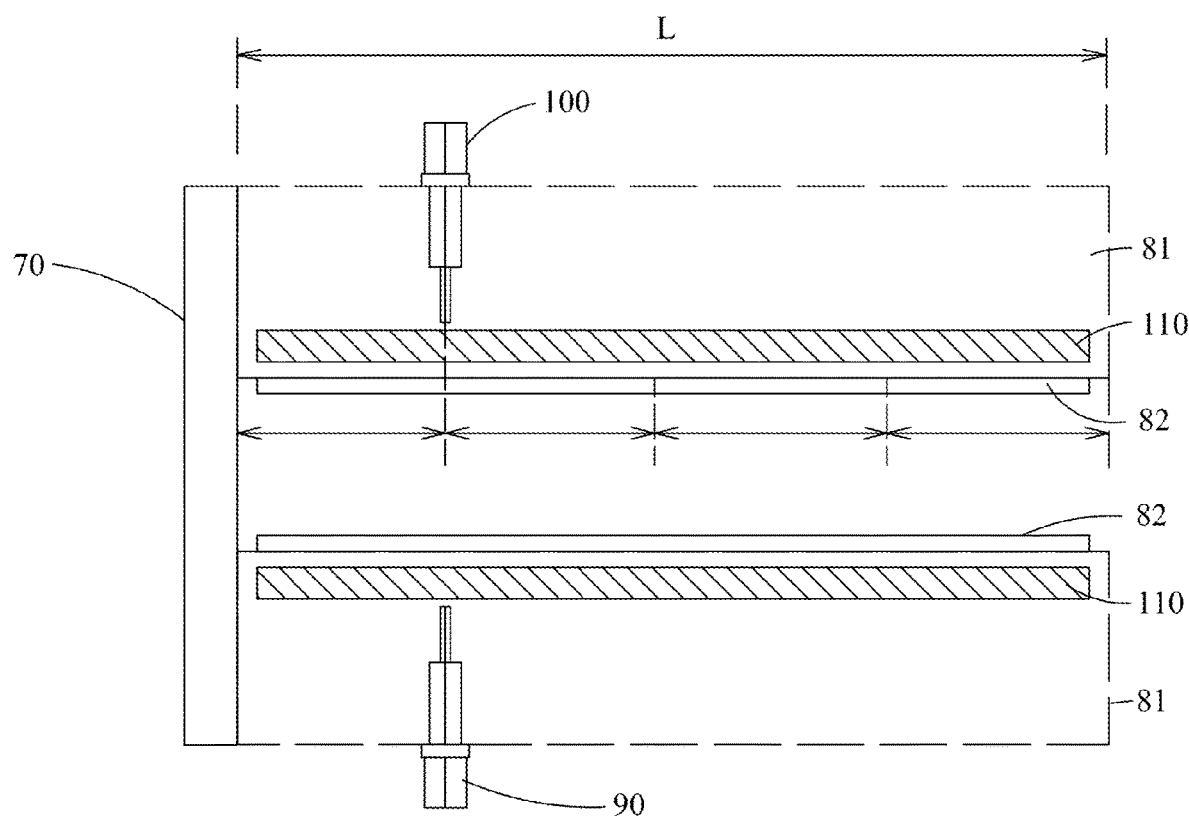
FIG. 12 is a side view of the fork-shaped microwave coupling moisture content sensor of FIG. 7 without a semi-cylindrical housing.

Referring to FIGS. 11 and 12, another embodiment of the fork-shaped microwave coupling moisture content sensor is disclosed. The elements of the present embodiment identical to the embodiment shown in FIGS. 7-10 are given the same numerical, and the description for them are thus omitted. The microwave emitting member 90 and the microwave receiving member 100 are distanced from one axial end surface of the respective semi-cylindrical housing 81 by a first length three times a second length distancing the microwave emitting member 90 and the microwave receiving member 100 from another axial end surface of the respective semi-cylindrical housing 81. The semi-cylindrical housing 81 has an axial length L defined by the distance between two end surfaces thereof. The axial length L is equal to the wavelength λ of electromagnetic wave having the resonance frequency, i.e., L=λ.

Figure 13:
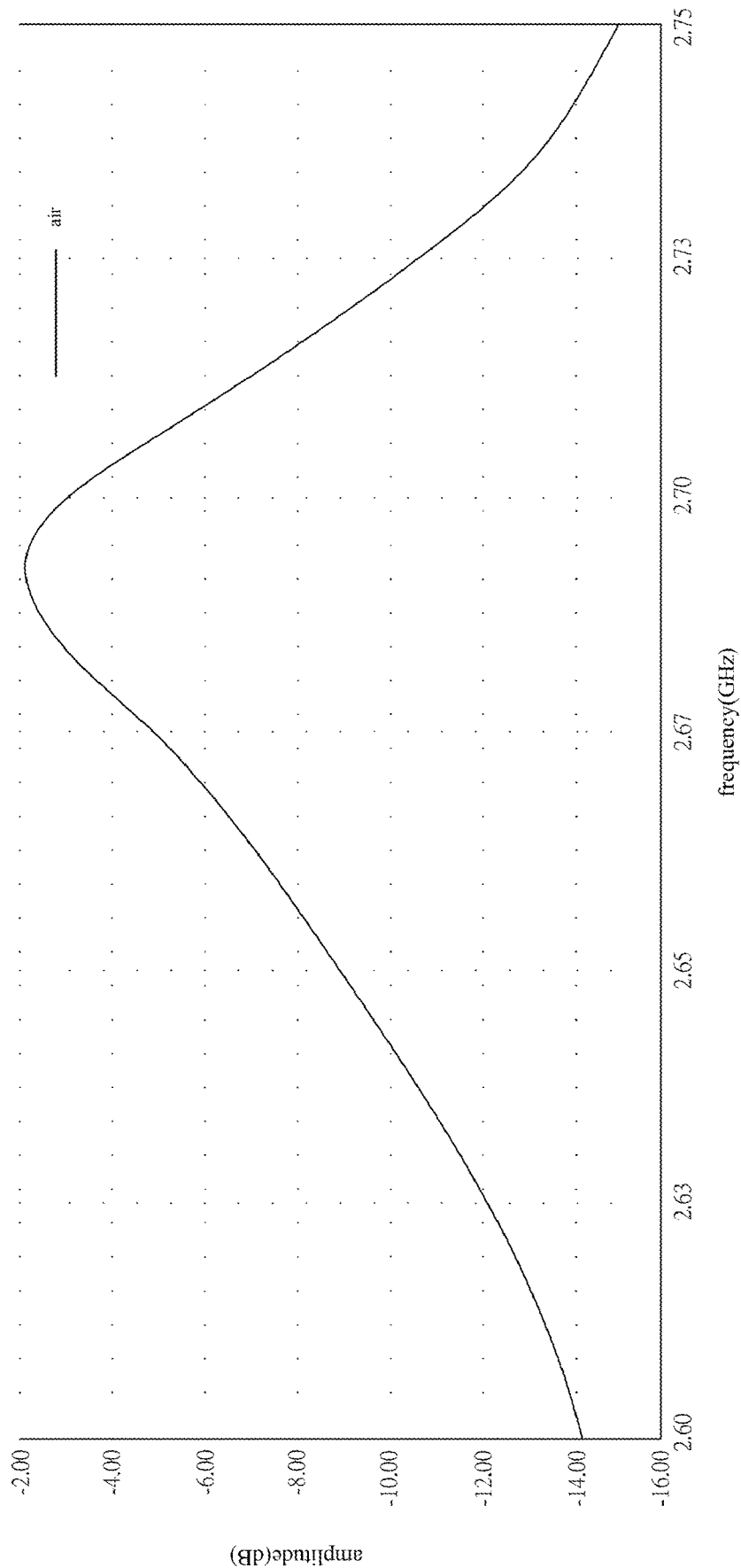
FIG. 13 is a frequency spectrum of resonance mode of the fork-shaped microwave coupling moisture content sensor of FIG. 7 without objects to be measured (merely air)
Figure 14:
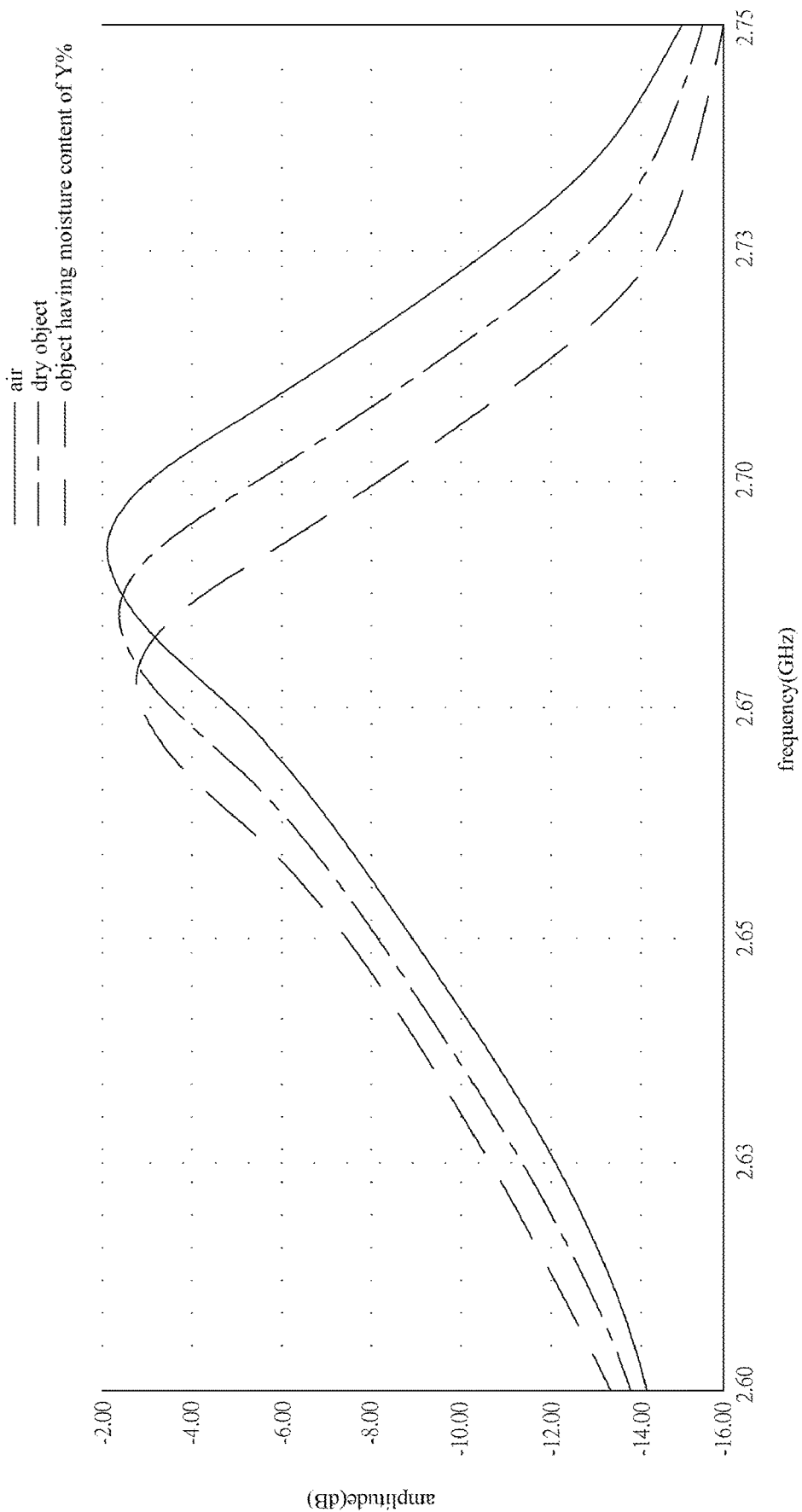
FIG. 14 is a frequency spectrum of resonance mode of the volute-shaped microwave coupling moisture content sensor of FIG. 7 having objects of different moisture contents.

Referring to FIG. 13, the resonance frequency of the semi-cylindrical microwave resonator 80 is detected as 2.68 GHz when no object (air only) is placed between the insulating plate 82 of the fork-shaped microwave coupling moisture content sensor. Referring to FIG. 14, the resonance frequencies and the amplitudes of the microwave resonator are detected when several objects having different moisture contents are placed between the insulating plates 82 of the fork-shaped microwave coupling moisture content sensor. The higher the moisture content is, and the resonance frequency of the microwave resonator is the lower, and the amplitude is also lower. As described above, as water has a high dielectric constant, objects having different moisture contents have different dielectric constant, whereby the resonance frequency of the semi-cylindrical microwave resonators 80 are thus correspondingly different. As shown in FIG. 14, the curve in the middle represents the resonance frequency of the semi-cylindrical microwave resonator 80 when only air is between the insulating plates 82. The other curves arranged along the direction to lower frequency represent the resonance frequency of the semi-cylindrical microwave resonators 80 corresponding to a dry object, an object having a moisture content of Y %, and an object having a moisture content of (Y+N) % respectively.

The microwave coupling moisture content sensor must be calibrated by several objects having known moisture contents before the microwave coupling moisture content sensor is used to detect the moisture contents of the objects to be measured. A linear regression correlation of the signal values generated in the microwave coupling moisture content sensor versus the moisture contents is derived through the calibration, whereby the moisture content of an object can be obtained by the linear regression correlation when the resonance frequency value and the amplitude value of the microwave resonator are detected.

Figure 15:
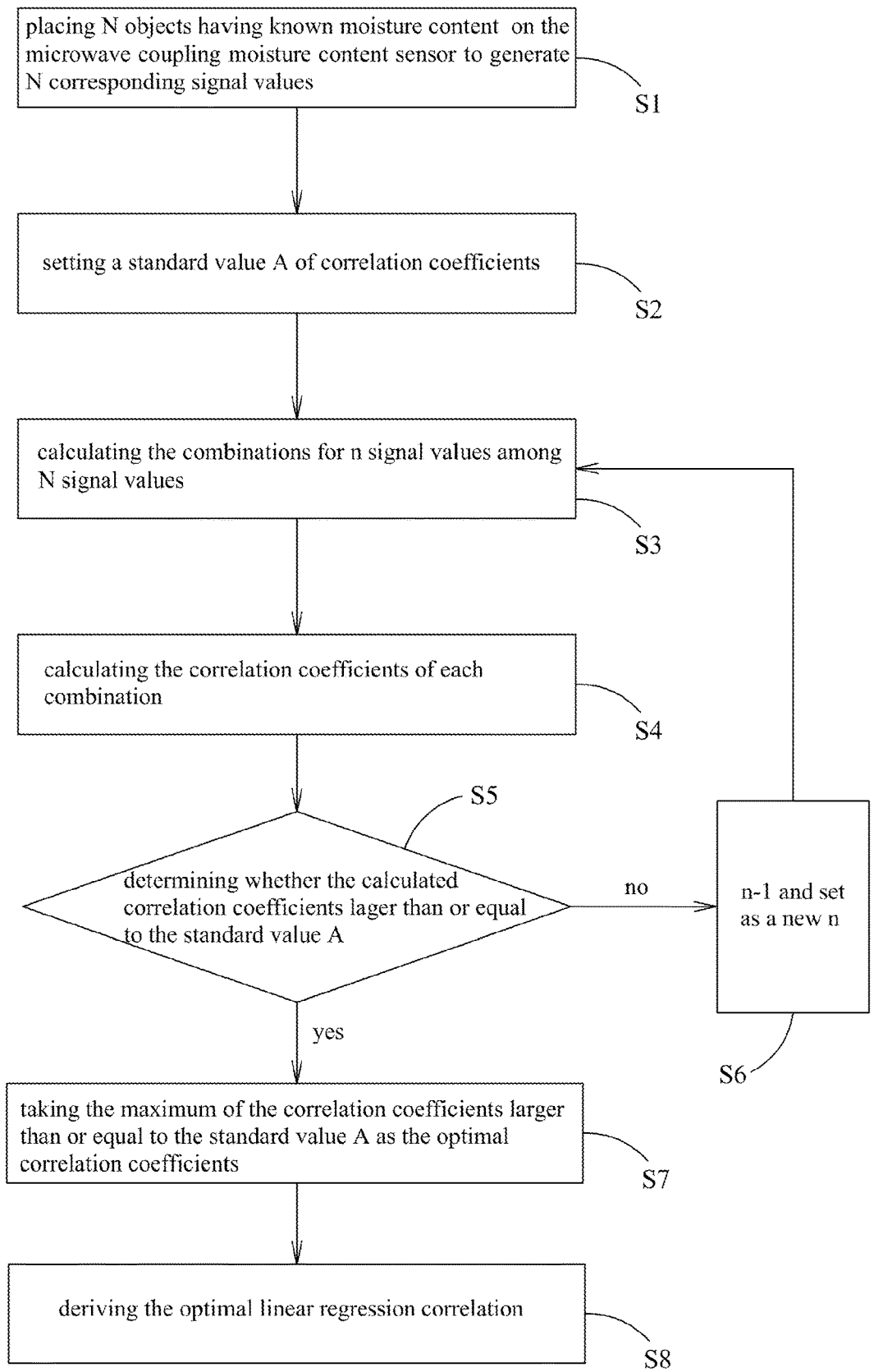
FIG. 15 is a flow chart of an embodiment of a method or deriving a linear regression correlation between signal data measured by a microwave moisture content sensor and moisture contents of objects of the present invention.

Referring to FIG. 15, an embodiment of a method for deriving a linear regression correlation between signal data generated by a microwave moisture content sensor and moisture contents of objects.

In the first step S1, N objects having known moisture contents are placed on the volute-shaped microwave coupling moisture content sensor or the fork-shaped microwave coupling moisture content sensor, whereby N signal values (resonance frequency and amplitude) are correspondingly detected. Afterwards, the process enters the second step S2.

In the second step S2, a standard values A of correlation coefficients is set. Afterwards, the process enters the third step S3.

In the third step S3, n signal values are taken from the N signal values (n<N), and the combinations of n among N are calculated ($C^N_n$). The n has a maximum of N, and the n has a minimum of 3. Afterwards, the process enters the fourth step S4.

In the fourth step S4, the correlation coefficients of each combination are calculated. Afterwards, the process enters the fifth step S5.

In the fifth step S5, the calculated correlation coefficients are compared with the standard values A to determine whether the calculated correlation coefficients are larger than or equal to the standard values A. If the calculated correlation coefficients of each combination are not larger than or equal to the standard values A, then the process enters the sixth step S6. If the calculated correlation coefficients of some combinations are larger than or equal to the standard values A, then the process enters the seventh step S7.

In the sixth step S6, the n is subtracted by 1, and the process move back to the third step S3, where the combinations of n−1 among N are calculated ($C^N_{n-1}$). The process continues to execute the fourth step S4 and the fifth step S5.

In the seventh step S7, the maximum of the calculated correlation coefficients larger than or equal to the standard values A is taken as the new standard values A. Afterwards, the process enters the eighth step S8.

In the eighth step S8, an optimal linear regression correlation is derived by the optimal correlation coefficients (the maximum value of the calculated correlation coefficients).

If none of the calculated correlation coefficients of all combinations for n from 3 to N, the maximum of the calculated correlation coefficients can be used to derive the linear regression correlation.

Figure 16:
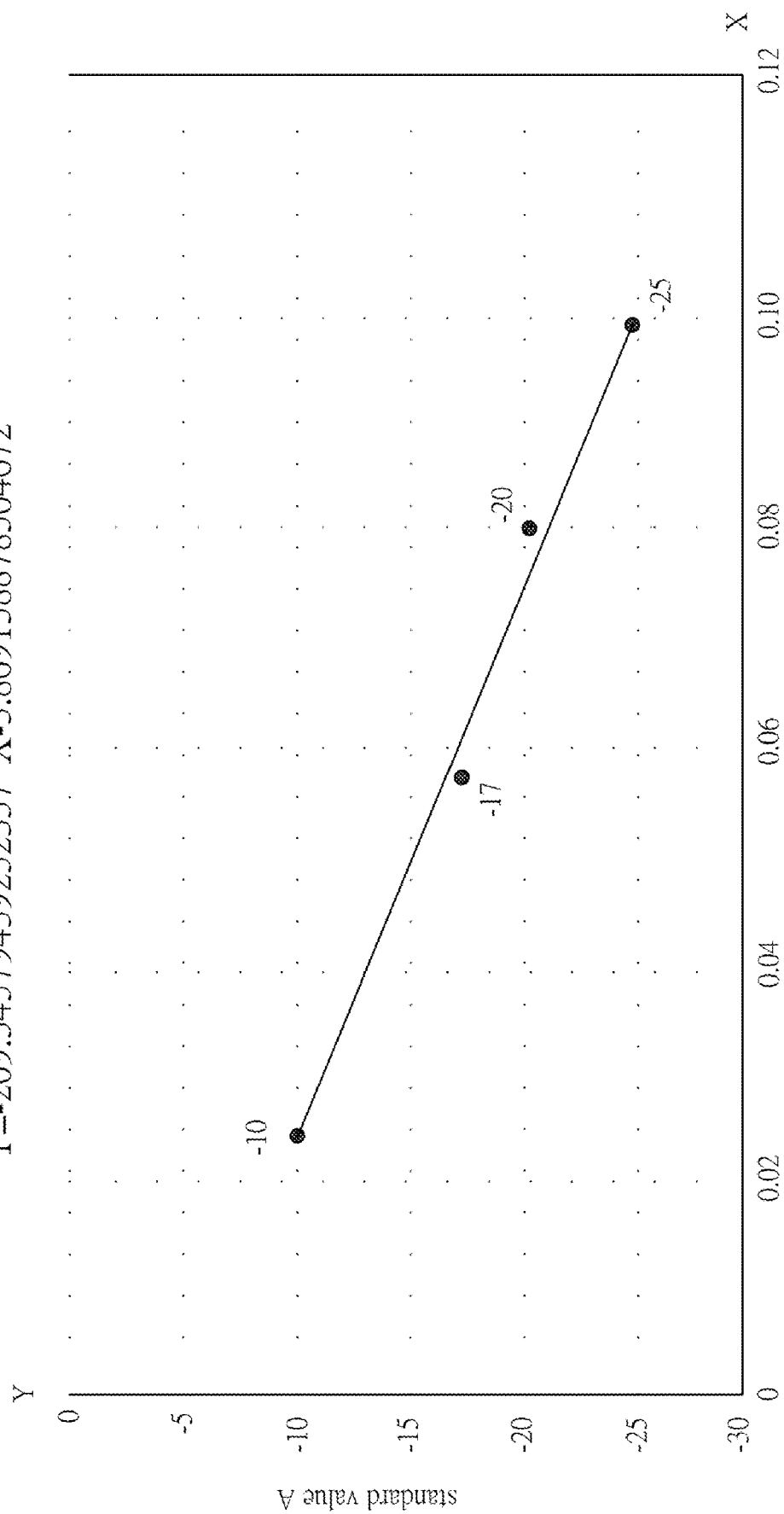
FIG. 16 is a diagram of a linear regression correlation obtained by the method of FIG. 15.

FIG. 16 shows an embodiment, where N=8. The microwave coupling moisture content sensor are calibrated by 8 objects having known moisture contents, and four sets of moisture content and signal value are used to derive the linear regression correlation, which has a correlation coefficient R2=0.9935.

An execution case of the method for deriving a linear regression correlation between signal data generated by a microwave moisture content sensor and moisture contents of objects is described, wherein an algorithm for the design of computer program accomplishing the method is shown.

At first, N moisture content values of objects are input, and a sequence B is created and set as an empty sequence. A while loop command is used to input N moisture content values into the sequence B, and the while loop is stopped until the value −1 is input.

N objects having different known moisture contents are placed on the microwave moisture content sensor, whereby N signal values are obtained. A sequence C is created and set as an empty sequence. The while loop command is used to input the N signal values into the sequence C, and the while loop is stopped until the value −1 is input.

A built-in LEN ( ) function is used to calculate the amount of total items in the sequence B, and save the value of the amount as a variable N.

A for loop D is built, an initial value of the for loop D is set as N, and an end value of the for loop D is set as 3. When the for loop D is executed once, the value of the for loop D is subtracted by 1. A recursive function rec is defined in the for loop D to calculate all combinations of the sequence B and the sequence C, wherein $$C^N_n = \frac{n*(n-1)*\ldots*(N-n+1)}{n*(n-1)*\ldots*1},$$

the initial value of n=N. All combinations $C_n^N(n=N)$ are listed one by one.

A for loop E is built, an initial value of the for loop E is set 0, and an end value is set as the number of total combinations calculated by the recursive function rec. When the for loop E is executed once, the value of the for loop E is added by 1, thereby a double loop is formed. A command "from scipy import stats." is used in the for loop E to derive a linear regression correlation and the correlation coefficients thereof for each combination.

A standard value A of correlation coefficients is defined, and the correlation coefficients of the combination obtained by the for loop E are compared with the standard value A. If the correlation coefficients of the combination are greater than or equal to the standard value A, the correlation coefficients of the combination are saved into the variable A, and the execution is escaped from the loops. The result of the execution of the program is displayed, which includes the correlation coefficients (variable A) and the linear regression correlation.

A variable F is created and an initial value thereof is set as 0. When the correlation coefficients of the combination calculated in the for loop E are all smaller than the standard value A, the maximum of the correlation coefficients of each sequence is saved to the variable F and the result is displayed, which includes the correlation coefficients (variable F) and the linear regression correlation.

n is subtracted by 1, and the for loop D is executed again to obtain the correlation coefficients of all combinations for the n−1 among N, $C^N_{n-1}$.

The correlation coefficients of all combinations are obtained and the combination of low correlation coefficients is removed, whereby a linear regression correlation of high precision is derived, which get rid of error caused by environment or human factors.

The microwave coupling moisture content sensor of the present invention generates electromagnetic waves through a particular coupling structure. The electromagnetic waves distribute above the microwave coupling moisture content sensor and penetrate the objects to be measured, whereby the resonance frequency of the microwave resonator is measured. The moisture content causes reduction in the resonance frequency of the microwave resonator, whereby the moisture contents of the objects are measured. The microwave coupling moisture content sensor detects a plurality of objects having known moisture contents and generates a plurality of signal values corresponding to the moisture content values. The combination of the signal values and the moisture content values having the optimal correlation coefficients is obtained through determination of the correlation coefficients of each combination of the signal values and the moisture content values meeting a required condition, and a regression correlation of measured signal value versus moisture content value of objects for the microwave coupling moisture content sensor is derived.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A volute-shaped microwave coupling moisture content sensor, comprising:
   a bottom wall;
   an inner shaft member spaced from the bottom wall by a distance and having a center;
   an outer annular member disposed on the bottom wall and surrounding the inner shaft;
   a connecting member connected to the inner shaft member at a first position and to the outer annular member at a second position, wherein the first position is spaced from the second position by an angular distance of 90 degree;
   a microwave feeding member disposed at the center of the inner shaft member; and
   an insulating plate disposed on an axial end surface of the outer annular member and covering the inner shaft member and the connecting member, wherein the bottom wall, the outer annular member, the inner shaft member, and the insulating plate constitute a microwave resonator.

2. The volute-shaped microwave coupling moisture content sensor as claimed in claim 1, wherein the connecting member comprises a curved main body, a first connecting portion and a second connecting portion, the curved main body is disposed on the bottom wall and located between the inner shaft member and the outer annular member, the first connecting portion connects one end of the curved main body and the inner shaft member, the second connecting portion connects another end of the curved main body and the outer annular member.

3. The volute-shaped microwave coupling moisture content sensor as claimed in claim 2, wherein the curved main body is an arced body having a central angle of 90 degree with respect to the center of the inner shaft member.

4. The volute-shaped microwave coupling moisture content sensor as claimed in claim 2, wherein the outer annular member has a notch formed at a connection of the connecting member and the outer annular member, and the second connecting portion is disposed in the notch.

5. The volute-shaped microwave coupling moisture content sensor as claimed in claim 2, wherein the first connecting portion has a length twice a length of the second connecting portion.

6. A fork-shaped microwave coupling moisture content sensor, comprising:
   a base;
   a pair of semi-cylindrical resonators disposed on the base, wherein each of the semi-cylindrical resonators comprises a semi-cylindrical housing and an insulating plate covering the semi-cylindrical housing, and the semi-cylindrical housings of the semi-cylindrical resonators are opposite disposed and spaced by a predetermined distance;
   a microwave emitting member disposed in one of the semi-cylindrical resonators;
   a microwave receiving member disposed in the other one of the semi-cylindrical resonators, wherein the microwave receiving member and the microwave emitting member are opposite disposed; and
   a pair of electromagnetic coupling members disposed in the semi-cylindrical resonators respectively and perpendicularly disposed with respect to the microwave emitting member and the microwave receiving member respectively.

7. The fork-shaped microwave coupling moisture content sensor as claimed in claim 6, wherein the electromagnetic coupling members are disposed in the vicinity of the insulating plate, the electromagnetic coupling member is separated from the microwave emitting member by a gap, and the electromagnetic coupling member is separated from the microwave receiving member by another gap.

8. The fork-shaped microwave coupling moisture content sensor as claimed in claim 6, wherein the microwave emitting member and the microwave receiving member are distanced from two axial end surfaces of the respective semi-cylindrical housing by an equal length, and the semi-cylindrical housing has an axial length defined by a distance between the axial end surfaces and being half of a wave length of the electromagnetic wave corresponding a resonance frequency of the semi-cylindrical resonator.

9. The fork-shaped microwave coupling moisture content sensor as claimed in claim 6, wherein the microwave emitting member and the microwave receiving member are distanced from one axial end surface of the respective semi-cylindrical housing by a first length three times as long as a second length distancing the microwave emitting member and the microwave receiving member from another axial end surface of the respective semi-cylindrical housing, and the semi-cylindrical housing has an axial length defined by a distance between the axial end surfaces and being equal to a wave length of the electromagnetic wave corresponding a resonance frequency of the semi-cylindrical resonator.

10. A method for deriving a linear regression correlation between signal data generated by a microwave moisture content sensor and moisture contents of objects, comprising:
    capturing a plurality of signal data of a plurality of objects having a known moisture content value with the microwave moisture content sensor;
    obtaining a combination number of n signal values among N signal values;
    calculating correlation coefficients of each combination;
    determining whether the correlation coefficients meet a required condition;
    if all the correlation coefficients fail to meet the required condition, obtaining a combination number of n−1 signal values among the N signal values;
    if all the correlation coefficients meet the required condition, obtaining the combination having optimal correlation coefficients;
    deriving a linear regression correlation of the signal values corresponding to the optimal correlation coefficients; and
    completing the linear regression correlation.

* * * * *